United States Patent
Gaur et al.

(10) Patent No.: US 10,037,349 B2
(45) Date of Patent: Jul. 31, 2018

(54) OPTIMIZATION OF AN IN MEMORY DATA GRID (IMDG) SCHEMA BASED UPON A NO-SQL DOCUMENT MODEL

(71) Applicant: International Business Machines Corporation, Armonk, NY (US)

(72) Inventors: Nitin Gaur, Round Rock, TX (US); Brian K. Martin, Cary, NC (US); Christopher D. Johnson, Rochester, MN (US); Douglas Berg, Rochester, MN (US); Dustin K. Amrhein, Zachary, LA (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 14/173,808

(22) Filed: Feb. 5, 2014

(65) Prior Publication Data

US 2015/0220579 A1 Aug. 6, 2015

(51) Int. Cl.
*G06F 17/30* (2006.01)

(52) U.S. Cl.
CPC .. *G06F 17/30324* (2013.01); *G06F 17/30011* (2013.01); *G06F 17/30292* (2013.01); *G06F 17/30584* (2013.01)

(58) Field of Classification Search
CPC ......... G06F 17/30324; G06F 17/30011; G06F 17/30292; G06F 17/30584; G06F 17/30368; G06F 17/30442; G06F 17/30598

See application file for complete search history.

(56) References Cited

U.S. PATENT DOCUMENTS

| | | | |
|---|---|---|---|
| 2002/0046204 A1* | 4/2002 | Hayes | G06F 11/3409 |
| 2005/0086242 A1* | 4/2005 | Ngai | G06F 17/30289 |
| 2007/0239790 A1 | 10/2007 | Cattell et al. | |

(Continued)

OTHER PUBLICATIONS

"UUID's as Primary Keys in MySQL" by Kekoa Vincent. Published Mar. 9, 2009. Accessed Nov. 10, 2015 from <http://kekoav.com/posts/uuid-primary-key-mysql>.*

(Continued)

*Primary Examiner* — Robert W Beausoliel, Jr.
*Assistant Examiner* — Arthur Ganger
(74) *Attorney, Agent, or Firm* — Steven M. Greenberg, Esq.; CRGO Law

(57) ABSTRACT

Embodiments of the present invention provide a method, system and computer program product for IMDG No-SQL schema optimization. In an embodiment of the invention, an IMDG No-SQL schema optimization method is provided. The method includes parsing documents of a No-SQL database, such as a document-oriented database, to select an object model mapping the documents of the No-SQL database to different portions of the IMDG, and selecting a partitioning schema for the IMDG according to the documents. Thereafter, a change in the documents of the No-SQL database can be detected, for example a change in data density of the documents of the No-SQL database, and in response to detecting the change, the documents of the No-SQL database are parsed to select a new object model of the No-SQL database mapping the documents to different portions of the IMDG, and to select a new partitioning schema for the IMDG according to the documents.

9 Claims, 1 Drawing Sheet

(56) References Cited

U.S. PATENT DOCUMENTS

| | | | |
|---|---|---|---|
| 2012/0158805 A1 | 6/2012 | Andre et al. | |
| 2012/0185500 A1 | 7/2012 | Bhogal et al. | |
| 2012/0246202 A1* | 9/2012 | Surtani | G06F 17/30607 707/812 |
| 2012/0303634 A1 | 11/2012 | Antani et al. | |
| 2012/0303675 A1* | 11/2012 | Antani | G06F 17/3033 707/802 |
| 2012/0311295 A1* | 12/2012 | Gaur | G06F 9/5072 711/173 |
| 2013/0227232 A1 | 8/2013 | Berg et al. | |
| 2014/0279834 A1* | 9/2014 | Tsirogiannis | G06F 17/30292 707/602 |
| 2014/0289185 A1* | 9/2014 | Lindblad | G06F 17/30923 707/608 |
| 2014/0330767 A1* | 11/2014 | Fowler | G06F 9/466 707/607 |
| 2015/0293945 A1* | 10/2015 | Amrhein | G06F 17/30584 707/722 |

OTHER PUBLICATIONS

Kilman, Dan, "From the Memory Grid to Cassandra," Extreme Big Data, http://extremebigdata.tumblr.com/post/38882085740/from-the-memory-grid-to-cassandra, Sep. 2013.
"In-Memory Data Grid by Cacheonix," Cacheonix Systems, Sep. 2013.
Shalom, Nati, "NOSQL," http://natishalom.typepad.com/nati_shaloms_blog/nosql/, Jun. 10, 2013.
Bernard, et al., "Hibernate OGM Reference Guide," http://docs.jboss.org/hibernate/ogm/4.0/reference/en-US/pdf/hibernate_ogm_reference.pdf, Jun. 2013.

* cited by examiner

OPTIMIZATION OF AN IN MEMORY DATA GRID (IMDG) SCHEMA BASED UPON A NO-SQL DOCUMENT MODEL

BACKGROUND OF THE INVENTION

Field of the Invention

The present invention relates to in memory database grid (IMDG) utilization and more particularly to the optimization of an IMDG schema.

Description of the Related Art

Database query processing refers to the receipt and execution of data queries against a database. Flat file databases generally process queries in accordance with a key used to locate matching records and to return the matching records to the requestor. To the extent that data is to be culled from different related records, a series of queries are required to locate different keys in different database tables so as to ultimately return the desired set of data. Relational databases improve upon flat file databases by permitting the logical joining together of different tables so as to execute a single query against the joined set of tables in order to produce a desired set of data.

An in memory data grid (IMDG) is a highly distributable form of a database that permits parallel processing across a set of disparately located computing devices. The use of an IMDG permits substantial parallelization of database operations and, in consequence, efficient utilization of unused processing resources in each host computing device supporting the IMDG. To the extent that data in the IMDG is highly distributed, relational database concepts cannot be effectively applied. Thus, though highly scalable, database operations in an IMDG are substantially granular and numerous in comparison to that of a traditional relational database.

A document-oriented database, by comparison, focuses upon the storage, retrieval and management of document-oriented information—namely semi-structured data. Document-oriented databases are a form of a "No-SQL" database that in contrast to relational database technology and the underlying principal of "relationship", are designed around an abstract notion of a document. In particular, a document-oriented database assumes documents encapsulate and encode data or information in some standard format or encoding. Presently, encodings include XML, YAML, JSON, and BSON, as well as binary forms like PDF and proprietary word processing and spreadsheet formats.

Of note, an IMDG as traditionally implemented provides a set of interconnected virtual machines as a single address space for in-memory data access. The data is thus partitioned amongst the virtual machines to provide scalability according to a partitioning scheme, for instance map/shard placement. The data source of an IMDB typically is a back end relational database; however, with the emergence of "No-SQL" databases, a challenge has emerged to provide integration between the document-oriented database based data model and corresponding data organization and partitioning in the IMDG. In particular, the challenge is not only to load the data into the IMDG from the document-oriented database, but also to load in the IMDG the requisite constructs and to optimize the data partition and distribution to ensure performance and scalability.

BRIEF SUMMARY OF THE INVENTION

Embodiments of the present invention address deficiencies of the art in respect to IMDG utilization and provide a novel and non-obvious method, system and computer program product for IMDG No-SQL schema optimization. In an embodiment of the invention, an IMDG No-SQL schema optimization method is provided. The method includes parsing documents of a No-SQL database, such as a document-oriented database, to select an object model mapping the documents of the No-SQL database to different portions of the IMDG and selecting a partitioning schema for the IMDG according to the documents. Thereafter, a change in the documents of the No-SQL database can be detected, for example a change in data density of the documents of the No-SQL database, and in response to detecting the change, the documents of the No-SQL database are parsed to select a new object model mapping the documents of the No-SQL database to different portions of the IMDG and to select a new partitioning schema for the IMDG according to the documents.

In one aspect of the embodiment, the object model of the IMDG is integer key, string value. In another aspect of the embodiment, the object model of the IMDG is hex key, compound value. In yet another aspect of the embodiment, the object model of the IMDG is compound key, compound value. In even yet another aspect of the embodiment, the partitioning can be per-container or fixed. In this regard, the fixed partition definition specifies how many partitions make up a grid in the IMDG the use of which results in a same number of partitions regardless of the number of grid containers and an even distribution of the partitions over the containers that change dynamically as partitions are added or removed. Conversely, per container partitioning specifies how many primary partitions should be deployed in each grid container, the number of which grow as grid containers are added and the number of which are maintained during failure by redistributing the number of partitions to remaining grid containers.

A data processing system can be configured for IMDG No-SQL schema optimization. The system can include a host computing system that includes at least one computer with memory and at least one processor. The system also can include a No-SQL database management system executing in the memory of the host computing system and managing storage of different documents of a No-SQL database in an IMDG. Finally, the system can include a schema optimization module executing in the memory of the host computing system. The module can include program code enabled to parse the documents of the No-SQL database to select an object model mapping the documents of the No-SQL database to different portions of the IMDG, to select a partitioning schema for the IMDG according to the documents, to detect a change in the documents, and to respond to detecting the change by parsing the documents to select a new object model mapping the documents to different portions of the IMDG and to select a new partitioning schema for the IMDG according to the documents.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodi

DETAILED DESCRIPTION OF THE INVENTION

Embodiments of the invention provide for IMDG No-SQL schema optimization. In an embodiment of the invention, a document in a No-SQL database for inclusion in an IMDG can be parsed to identify different fields of document included therein. The identified fields in turn can be used to select a desired object map mapping the documents to different portions of the IMDG, and also to select a partitioning schema for the IMDG. Finally, upon detecting a change in data density or data type of the documents to be stored in the IMDG, a desired object map and partitioning scheme can be reselected so as to provide for a continual optimization of the IMDG supporting the No-SQL database.

Figure 1:
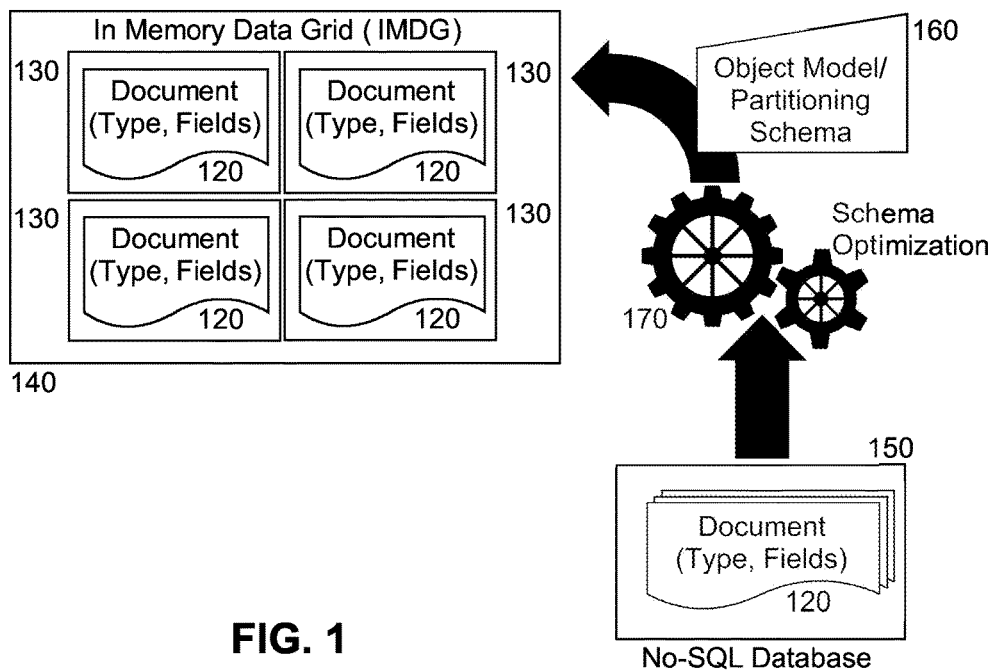
- FIG. 1 is a pictorial illustration of a process for IMDG No-SQL schema optimization.

In further illustration, FIG. 1 pictorially shows a process for IMDG No-SQL schema optimization. As shown in FIG. 1, an IMDG 140 can include different virtual machines 130 storing different documents 120 of a No-SQL database 150, for instance a document-oriented database. Schema optimization logic 170 can analyze the content of the documents 120—for instance, the types of the documents 120 and the fields of the documents 120—in order to select an optimal object model and partition schema 160 for storing the documents 120 in the virtual machines 130 of the IMDG 140. In this regard, the optimal object model by way of example can include integer key, string value, or hex key, compound value or compound key, compound value. Likewise, the partitioning schema can include by way of example, partitioning per-container or fixed partitioning.

Figure 2:
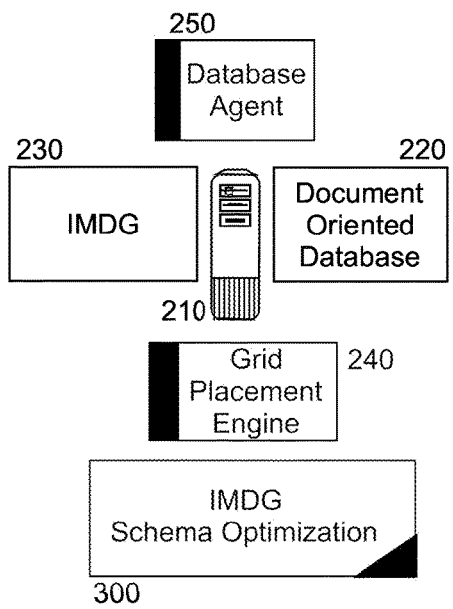
FIG. 2 is a schematic illustration of a data processing system configured for IMDG No-SQL schema optimization; and, FIG. 3 is a flow chart illustrating a process for IMDG No-SQL schema optimization.

The process described in connection with FIG. 1 can be implemented as part of a data processing system. In yet further illustration, FIG. 2 schematically shows a data processing system configured for IMDG No-SQL schema optimization. The system can include a host computing system 210 that includes one or more computers, each with memory and at least one processor. An IMDG 230 can be provided within the host computing system 210 so as to include different virtual machines storing objects according to an object placement map managed by a grid placement engine 240 executing in the memory of the host computing system 210.

A document oriented database 220 as a species of a No-SQL database can be provided within the host computing system 210. The document-oriented database 220 can include a multiplicity of different documents, each with one or more fields and a corresponding type. A database agent 250, in turn, can be coupled to the document oriented database 220 and can detect and report changes in the number of documents in the document oriented database 220, or a change in the type of documents in the document oriented database 220. Of note, an IMDG schema optimization module 300 can be coupled to or included as part of the grid placement engine 240 and can access the database agent 250.

The IMDG schema optimization module 300 can include program code that when executed in the memory of the host computing system is enabled to parse the documents of the document oriented database 220 to select an object model mapping the documents to different portions of the IMDG 230, and also to select a partitioning schema for the IMDG 230 according to the documents. The program code of the IMDG schema optimization module 300 also can be enabled to detect a change in the documents indicated by the database agent 250. In response to detecting the change, the program code of the IMDG schema optimization module 300 can be enabled to again parse the documents to select a new object model mapping the documents to different portions of the IMDG 230, and to select a new partitioning schema for the IMDG 230 according to the documents.

Figure 3:
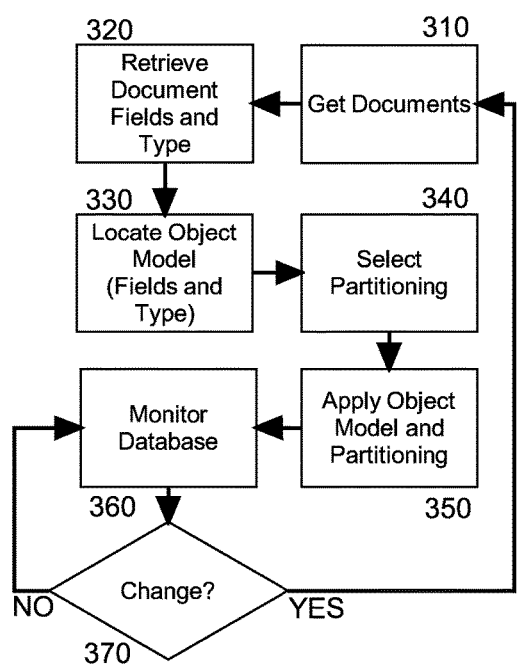

In even yet further illustration of the operation of the IMDG schema optimization logic 300, FIG. 3 is a flow chart illustrating a process for IMDG No-SQL schema optimization. Beginning in block 310, a set of documents can be retrieved for analysis from a No-SQL database such as a document-oriented database. In block 320, the fields and type can be determined for the retrieved documents and in block 330, the determined fields, the determined type or both can be used to select a corresponding object model for storing the documents in the different portions of an IMDG. For instance, the object model can be integer key, string value, or hex key, compound value or compound key, compound value, to name three examples. Likewise, in block 340 a partitioning schema can be selected, for instance partitioning per-container or fixed partitioning.

Thereafter, in block 350 the object model and partitioning schema can be applied to the IMDG and the documents in the No-SQL database can be placed into the IMDG by a corresponding grid placement engine. Subsequently, in block 360 the content of the No-SQL database can be monitored for document density and also for document type. When a change is detected in decision block 370, the process of object model and schema optimization can repeat through block 310. In this way, dynamic changes to the composition of the No-SQL database can be accommodated in optimally configuring the IMDG.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method comprising:
   parsing a document in a No-SQL database for inclusion in an IMDG (in memory data grid) to identify a set of different fields and a type of the document included therein;
   selecting, by machine logic, a desired object model that maps the document to a different portion of the IMDG;
   selecting a partitioning schema for the IMDG according to the identified set of fields and type of the document, with the first partitioning schema partitioning being a fixed partitioning type of schema;
   responsive to the detection of a change in data density or data type of the documents, parsing the document to identify new set of fields, reselecting the desired object map; and
   selecting a second partitioning schema for the reselected desired object map according to the new set of fields and the type of the document with the second partitioning schema partitioning being a per-container partitioning type of schema, so as to provide for a continual optimization of the IMDG supporting the No-SQL database.

2. The method of claim 1, wherein the IMDG comprises different virtual machines storing different documents of a no-SQL database.

3. The method of claim 1, wherein the continual optimization includes determining an optimal object model for the IMDG comprising one of an integer key, string value, hex key, compound value compound key or compound value and selecting either partitioning per-container or fixed partitioning.

4. A data processing system configured for in memory data grid (IMDG) No-SQL schema optimization comprising:
   a host computing system comprising at least one computer with memory and at least one processor;
   a No-SQL database management system executing in the memory of the host computing system and managing storage of different documents of a No-SQL database in an IMDG; and,
   a schema optimization module executing in the memory of the host computing system, the module comprising program code enabled to parse a document in a No-SQL database for inclusion in an IMDG (in memory data grid) to identify a set of different fields and a type of the document included therein, to select a desired object model that maps the document to a different portion of the IMDG, to select a partitioning schema for the IMDG according to the identified set of fields and type of the document, with the first partitioning schema partitioning being a fixed partitioning type of schema, to respond to the detection of a change in data density or data type of the documents by parsing the document to identify new set of fields, reselecting the desired object map and selecting a second partitioning schema for the reselected desired object map according to the new set of fields and the type of the document with the second partitioning schema partitioning being a per-container partitioning type of schema, so as to provide for a continual optimization of the IMDG supporting the No-SQL database.

5. The system of claim 4, wherein the IMDG comprises different virtual machines storing different documents of a no-SQL database.

6. The system of claim 4, wherein the continual optimization includes determining an optimal object model for the IMDG comprising one of an integer key, string value, hex key, compound value compound key or compound value and selecting either partitioning per-container or fixed partitioning.

7. A computer program product for in memory data grid (IMDG) No-SQL schema optimization, the computer program product comprising a computer readable storage medium having program instructions embodied therewith, the program instructions executable by a device to cause the device to perform a method comprising:
   parsing a document in a No-SQL database for inclusion in an IMDG (in memory data grid) to identify a set of different fields and a type of the document included therein;
   selecting, by machine logic, a desired object model that maps the document to a different portion of the IMDG;
   selecting a partitioning schema for the IMDG according to the identified set of fields and type of the document, with the first partitioning schema partitioning being a fixed partitioning type of schema;
   responsive to the detection of a change in data density or data type of the documents, parsing the document to identify new set of fields, reselecting the desired object map; and
   selecting a second partitioning schema for the reselected desired object map according to the new set of fields and the type of the document with the second partitioning schema partitioning being a per-container partitioning type of schema, so as to provide for a continual optimization of the IMDG supporting the No-SQL database.

8. The computer program product of claim 7, wherein the IMDG comprises different virtual machines storing different documents of a no-SQL database.

9. The computer program product of claim 7, wherein the continual optimization includes determining an optimal object model for the IMDG comprising one of an integer key, string value, hex key, compound value compound key or compound value and selecting either partitioning per-container or fixed partitioning.

* * * * *